April 29, 1952

H. T. LAMB 2,594,936

ELECTRICALLY DRIVEN MACHINE FOR MIXING
AND KNEADING OR FOR MINCING

Filed May 2, 1950

Inventor
Harold Thomas Lamb
By Alexander Powell
Attorneys

April 29, 1952

H. T. LAMB 2,594,936

ELECTRICALLY DRIVEN MACHINE FOR MIXING
AND KNEADING OR FOR MINCING

Filed May 2, 1950

Inventor
Harold Thomas Lamb
Alexander Howell
Attorneys

Patented Apr. 29, 1952

2,594,936

UNITED STATES PATENT OFFICE 2,594,936

ELECTRICALLY DRIVEN MACHINE FOR MIXING AND KNEADING OR FOR MINCING

Harold Thomas Lamb, Newcastle-on-Tyne, England

Application May 2, 1950, Serial No. 159,418
In Great Britain May 12, 1949

14 Claims. (Cl. 146—182)

This invention relates to electrically-driven machines capable of mixing and kneading and of mincing, the machine being of the kind comprising a frame supporting a power driven spindle carrying a rotating bowl, and an upstanding rear column adjacent the spindle, the column carrying an arm from which depends a mixing or kneading dolly adapted to coact with the internal periphery of the bowl and be rotated thereby, the machine being readily convertible into a mincing machine by removing the bowl, turning the machine on one end and substituting a rotary mincer for the bowl, the machine being provided with novel means for catching the mince.

The object of the invention is to provide an improved form of receptacle for receiving the minced product, such receptacle being moved by the mince as it falls thereon to provide even distribution thereof. Another object is to provide a receptacle which will also serve as a cover for the bowl which is thus adapted to serve as a closed repository for storing, when not in use the several accessories provided with the machine. The details of the frame and the motor drive are shown in my copending application Serial No. 188,367 filed October 4, 1950.

According to the invention the receptacle for the extruded mince comprises a circular flanged dish having a central bored boss by which for mincing it is rotatably mounted on a shaft projecting laterally from the upstanding rear column, near the mincer. In addition, the diameter of the dish is preferably such that it can be fitted snugly over the bowl as a lid therefor, the bored boss being passed over a downwardly projecting pin on the dolly supporting arm, about which pin the dolly is journaled when a mixing operation is carried out. The plane containing the axis of the shaft on the rear column is offset from that containing the axis of the power driven mincer, so that the extruding mince imparts a turning moment to the mince receptacle to help distribute the mince therein.

The invention will now be described by way of example with reference to the accompanying drawings which show one form of machine incorporating the invention.

Figure 1:
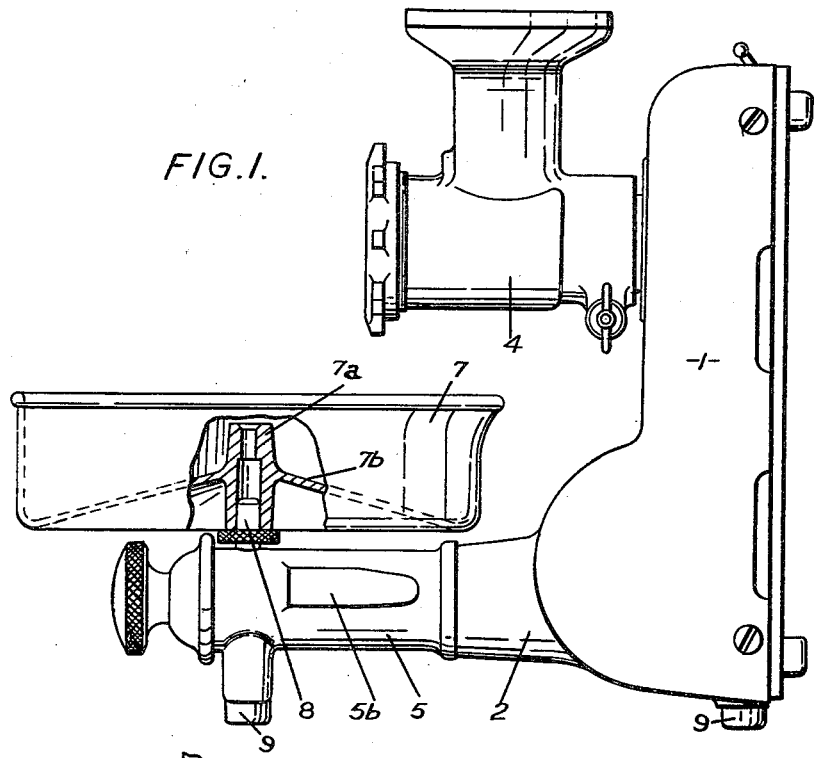
Fig. 1 is a side view of the machine in use as a mincer.

Referring more particularly to the drawings, the machine comprises a hollow rectangular base 1 having an upstanding rear column 2 which is in a plane offset from the axial plane of the power driven spindle hereinafter referred to. An electric motor (not shown) is housed in the base 1 and drives the power driven spindle (not shown) with which the bottom of a cylindrical mixing bowl 3 (Fig. 3), or alternatively the spindle of a rotary mincer 4 (Fig. 1) can be engaged. A vertical sleeve 5 carrying a headed arm 5a is pivotally mounted on the upstanding rear column 2 and, when the machine is used for mixing or kneading and its bowl 3 is applied to the power driven spindle, a dolly (not shown) may be suspended from the said arm by means of a pin 6 so as to engage the internal periphery of the bowl and be revolved thereby, and if desired a bowl scraper (not shown) may similarly be suspended from a second arm pivoted in a bearing 5b at one side of the sleeve 5. The suspension of the dolly and scraper is not shown as it is not material to the present invention.

Figure 2:
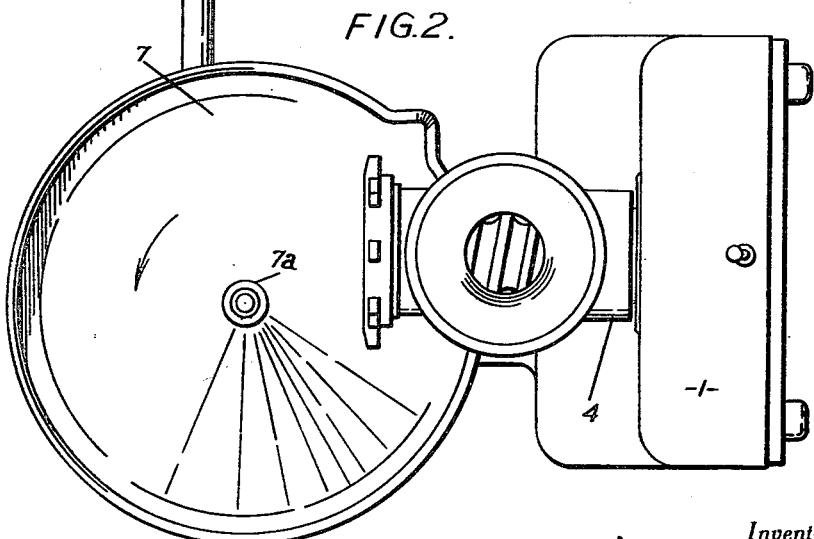
Fig. 2 is a plan of Fig. 1.

A deep flanged cylindrical receptacle 7 formed with a central boss 7a which projects from either side of the conical bottom 7b is adapted to fit over the bowl as a lid, the said boss being bored out to permit an alternate use thereof wherein it engages a shaft 8 projecting from the front face of the rear column 2 of the machine a little in front of the mincer discharge orifice when the mincer is fitted on, Figs. 1 and 2.

Figure 3:
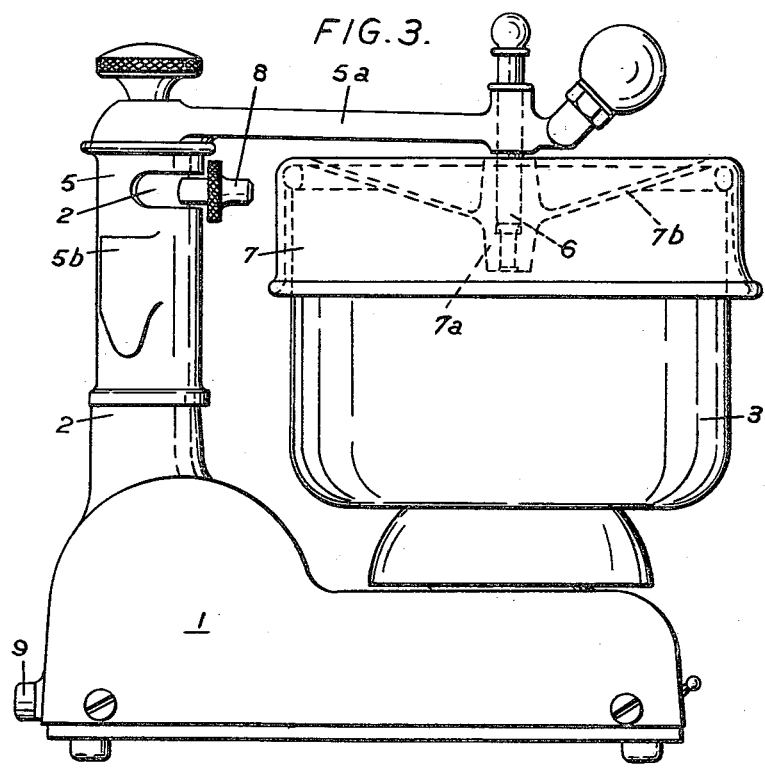
Fig. 3 is a side view of the machine showing the bowl fitted thereto and covered with the dish.

When the machine is not in use, the mincer 4, scraper and dolly can be placed in the bowl 3 and the receptacle 7 applied thereto as a lid to protect them from dust as shown in Fig. 3. When the machine is to be used as a mincer it is turned on end and the mincer 4 is applied to the driving spindle, the receptacle 7 being applied to the shaft 8 to receive the extruded mince.

Owing to the offset position of the shaft 8 relatively to the spindle axis and discharge orifice of the mincer 4 (Fig. 2), the extruded mince is deposited in the receptacle 7 to one side of its axis near the upper portion of the conical bottom, and so imparts a turning moment to it causing it to rotate. The mince rolls down towards the periphery of the dish and is evenly distributed in it.

The sleeve 5 and the end of the hollow base are fitted with rubber foot pads 9 for use when the machine is turned on end during use as a mincer.

I claim:

1. A convertible machine having a motor-driven spindle and being capable of use as a mincing machine in one position wherein a mincer is mounted on said spindle and driven thereby, and capable of use as a mixing machine in a second position wherein a bowl is mounted on said spindle and driven thereby in mixing association with a kneading dolly and a bowl scraper, comprising an L-shaped base housing the motor-drive and spindle, the latter projecting from one leg of the L parallel to the other leg; an arm extending from the other leg parallel to said first leg; a dolly bearing pin on the outer end of the arm, the axis of the pin being parallel to that of the spindle, and said arm being swingable on said other leg of the frame whereby the axis of the pin may be moved to a plurality of positions parallel to the axis of the spindle including a position wherein the axes are aligned; a shaft fixed on said other leg and normal thereto, said shaft being also normal to the axis of the spindle and offset therefrom; and a shallow receptacle having a bearing in its bottom whereby when the machine is in mixing position resting on its first leg and the bowl is on the spindle said receptacle may be inverted on the bowl as a cover therefor and held in place by the arm, said pin being located in the receptacle bearing, and whereby when the machine is in mincing position resting on the other leg and the mincer is on the spindle, the receptacle may be journaled on said shaft subjacent the mincer orifice, the receptacle being rotated by the offset discharge thereof.

2. In a device as set forth in claim 1, said receptacle comprising a bottom; a cylindrical side; and a boss centrally located and extending both above and below the bottom and having a bore, said bearing being located in said bore.

3. In a device as set forth in claim 2, said bottom being conical to make the periphery of the receptacle deeper than the center.

4. A convertible machine having a motor-driven spindle and being capable of use as a mincing machine in one position wherein a mincer is mounted on said spindle and driven thereby, and capable of use as a mixing machine in a second position wherein a bowl is mounted on said spindle and driven thereby, comprising an L-shaped base housing the motor-drive and spindle, the latter projecting from one leg of the L parallel to the other leg; a shaft fixed on said other leg and normal thereto, said shaft being also normal to the axis of the spindle and offset therefrom; and a receptacle having a bearing in its bottom whereby when the machine is in mincing position resting on the other leg and the mincer is on the spindle, the receptacle may be journaled on said shaft subjacent the mincer orifice, the receptacle being rotated by the offset discharge therefrom.

5. In a device as set forth in claim 4, said receptacle comprising a bottom; a cylindrical side; and a boss centrally located and extending both above and below the bottom and having a bore, said bearing being located in said bore and said bottom being conical to make the periphery of the receptacle deeper than the center.

6. In a device as set forth in claim 4, said base having an arm projecting from said other leg over said spindle and having a pin aligned therewith, and said receptacle being of such diameter as to fit snugly over the bowl, whereby when said machine is in mixing position resting on said first leg and the bowl is on the spindle said receptacle may be inverted on the bowl as a cover therefor and held in place by the arm, said pin being located in the receptacle bearing.

7. A convertible machine having a motor-driven spindle and being capable of use as a mincing machine in one position wherein a mincer is mounted on said spindle and driven thereby, and capable of use as a mixing machine in a second position wherein a mixer is mounted on said spindle and driven thereby, comprising an L-shaped base housing the motor-drive and spindle, the latter projecting from one leg of the L parallel to the other leg; an arm extending from the other leg parallel to said first leg, said arm being swingable on said other leg of the frame whereby the arm may be moved to a position over the spindle or to a position away from it, and a receptacle whereby when the machine is in mixing position resting on its first leg and the mixer is on the spindle said receptacle may be inverted on the mixer as a cover therefor and held in place by the arm, and whereby when the machine is in mincing position resting on the other leg and the mincer is on the spindle, the receptacle may be journaled on said other leg subjacent the mincer orifice.

8. In a device as set forth in claim 7, a shaft fixed on said other leg and normal thereto, the axis of the shaft being offset from that of the spindle; and the receptacle comprising a bottom; a cylindrical side; a boss centrally located in the bottom and having a bore; and a bearing located in said bore to engage the shaft, the receptacle being rotated by the offset discharge of the mincer.

9. In a device as set forth in claim 8, said bottom being conical to make the periphery of the receptacle deeper than the center.

10. A device as set forth in claim 7, wherein in mincing position the axis of the receptacle is offset from the axis of the spindle, the receptacle being rotated by the discharge of the mixer.

11. A convertible machine having a motor-driven spindle and being capable of use as a mincing machine in one position wherein a mincer is mounted on said spindle and driven thereby, and capable of use as a mixing machine in a second position wherein a mixer is mounted on said spindle and driven thereby, comprising an L-shaped base housing the motor-drive and spindle, the latter projecting from one leg of the L parallel to the other leg; and a receptacle whereby when the machine is in mixing position resting on its first leg and the mixer is on the spindle said receptacle may be inverted on the mixer as a cover therefor, and whereby when the machine is in mincing position resting on the other leg and the mincer is on the spindle, the receptacle may be journaled on said other leg subjacent the mincer orifice.

12. In a device as set forth in claim 11, a shaft fixed on said other leg and normal thereto, the axis of the shaft being offset from that of the spindle; and the receptacle comprising a bottom; a cylindrical side; a boss centrally located in the bottom and having a bore; and a bearing located in said bore to engage the shaft, the receptacle being rotated by the offset discharge of the mincer.

13. In a device as set forth in claim 12, said bottom being conical to make the periphery of the receptacle deeper than the center.

14. A device as set forth in claim 11, wherein in mincing position the axis of the receptacle is offset from the axis of the spindle, the receptacle being rotated by the discharge of the mixer.

HAROLD THOMAS LAMB.

REFERENCES CITED

The following references are of record in the file of this patent:

UNITED STATES PATENTS

| Number | Name | Date |
| --- | --- | --- |
| 1,314,962 | Hottmann | Sept. 2, 1919 |